United States Patent
Wang et al.

(10) Patent No.: US 11,997,612 B2
(45) Date of Patent: May 28, 2024

(54) METHOD AND APPARATUS FOR POWER CONTROL

(71) Applicant: BEIJING XIAOMI MOBILE SOFTWARE CO., LTD., Beijing (CN)

(72) Inventors: Deqian Wang, Beijing (CN); Shui Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 42 days.

(21) Appl. No.: 17/876,234

(22) Filed: Jul. 28, 2022

(65) Prior Publication Data
US 2023/0319729 A1    Oct. 5, 2023

(30) Foreign Application Priority Data

Mar. 29, 2022    (CN) .......................... 202210325704.0

(51) Int. Cl.
*H04W 52/18*    (2009.01)
(52) U.S. Cl.
CPC .................................. *H04W 52/18* (2013.01)
(58) Field of Classification Search
CPC ...................................................... H04W 52/18
See application file for complete search history.

(56) References Cited

U.S. PATENT DOCUMENTS

| | | | | |
|---|---|---|---|---|
| 8,909,282 B2 * | 12/2014 | Ngai | ..................... | H04W 52/34 455/574 |
| 9,113,491 B2 * | 8/2015 | Montojo | ............. | H04W 52/325 |
| 11,166,241 B2 * | 11/2021 | Wu | ..................... | H04W 52/288 |
| 11,553,503 B2 * | 1/2023 | Parron | ..................... | H04W 4/46 |
| 2007/0135131 A1 * | 6/2007 | Ishii | ..................... | H04L 47/824 455/453 |
| 2011/0176498 A1 * | 7/2011 | Montojo | ............. | H04W 52/325 370/329 |
| 2012/0270592 A1 * | 10/2012 | Ngai | .................... | H04W 52/226 455/522 |
| 2016/0249375 A1 * | 8/2016 | Auer | ..................... | H04W 72/54 |
| 2021/0204225 A1 * | 7/2021 | Wu | ..................... | H04W 52/283 |
| 2022/0015125 A1 * | 1/2022 | Liu | ..................... | H04W 72/20 |
| 2022/0159587 A1 * | 5/2022 | Park | ..................... | H04W 52/242 |
| 2023/0018958 A1 * | 1/2023 | Gan | ................... | H04W 36/0022 |
| 2023/0058614 A1 * | 2/2023 | Elazzouni | ............ | H04W 72/23 |
| 2023/0099813 A1 * | 3/2023 | Parron | ............... | H04L 27/0006 370/330 |

FOREIGN PATENT DOCUMENTS

| | | |
|---|---|---|
| CN | 113993193 A | 1/2022 |
| WO | WO 2012122116 A1 | 9/2012 |
| WO | WO 2018236335 A1 | 12/2018 |

OTHER PUBLICATIONS

European Patent Application No. 22187597.4, Search and Opinion dated Jul. 27, 2023, 7 pages.

* cited by examiner

*Primary Examiner* — Hai V Nguyen
(74) *Attorney, Agent, or Firm* — COZEN O'CONNOR

(57) ABSTRACT

A method for power control in a terminal device includes determining service types of at least one service to be performed by the terminal device; configuring a target transmit power corresponding to each service performed by the terminal device according to each service type and a power-controlled transmit power of the terminal device. A terminal device for executing the method for power control is also disclosed.

15 Claims, 3 Drawing Sheets determining service types of at least one service to be performed by a terminal device — 102 configuring a target transmit power corresponding to each service performed by the terminal device according to each service type and a power-controlled transmit power of the terminal device — 103

US 11,997,612 B2

METHOD AND APPARATUS FOR POWER CONTROL

CROSS-REFERENCE TO RELATED APPLICATIONS

This application is based upon and claims priority to Chinese Patent Application No. 202210325704.0 filed on Mar. 29, 2022, the entire content of which is incorporated herein by reference for all purposes.

TECHNICAL FIELD

The present disclosure relates to the field of wireless communication, and in particular, to a method and an apparatus for power control, a terminal device and a storage medium.

BACKGROUND

At present, a terminal device integrates multiple functions such as games, entertainment, communication, office, and business. For example, a mobile phone may not only be held in the hand to make calls, but also may be held horizontally to play games, or may be used with a selfie stick to upload videos. This means that the mobile phone can perform different services in parallel. In different business scenarios, the status of the mobile phone changes the antenna attenuation, which leads to problems such as increased uplink bit error rate and low upload rate of the mobile phone. Therefore, improving the power allocation of the terminal device is a technical problem that needs to be solved.

SUMMARY

An embodiment of the present disclosure provides a method for power control, including:
  determining service types of at least one service to be performed by a terminal device;
  configuring a target transmit power corresponding to each service performed by the terminal device according to each service type and a power-controlled transmit power of the terminal device.

Another embodiment of the present disclosure provides a terminal device, including:
  at least one processor; and
  a memory communicatively coupled to the at least one processor; wherein,
  the memory is stored with instructions executable by the at least one processor, and when the instructions are executed by the at least one processor, the at least one processor is enabled to perform steps of the method described above.

Another embodiment of the present disclosure provides a non-transitory computer-readable storage medium stored with computer instructions, wherein the computer instructions are configured to cause the computer to perform the steps of the method in the above aspect.

Additional aspects and advantages of the present disclosure will be set forth, in part, from the following description, and in part will be apparent from the following description, or may be learned by practice of the present disclosure.

BRIEF DESCRIPTION OF THE DRAWINGS

The above and/or additional aspects and advantages of the present disclosure will become apparent and readily understood from the following description of embodiments taken in conjunction with the accompanying drawings, wherein.

DETAILED DESCRIPTION

Figure 1:
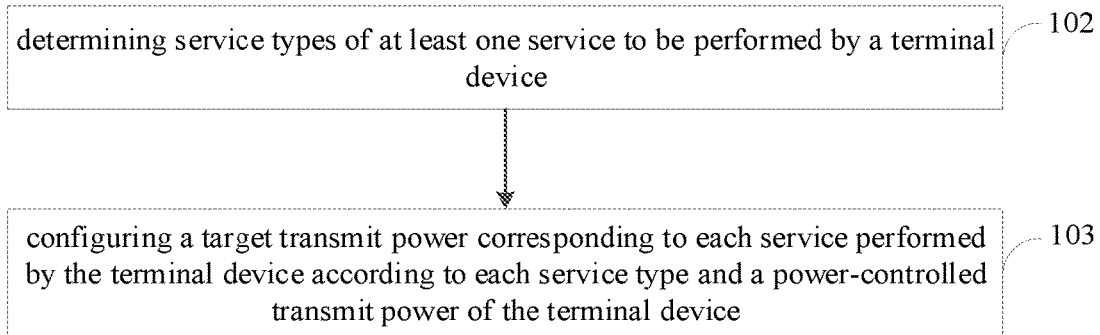
FIG. 1 is a schematic flowchart of a method for power control provided by an embodiment of the present disclosure.

Embodiments of the present disclosure are described in detail below, examples of which are illustrated in the accompanying drawings, wherein the same or similar reference numerals refer to the same or similar elements or elements having the same or similar functions throughout. The embodiments described below with reference to the accompanying drawings are exemplary, and are intended to explain the present disclosure and should not be construed as limiting the present disclosure.

The method and apparatus for power control, the terminal device and the storage medium according to embodiments of the present disclosure are described below with reference to the accompanying drawings.

FIG. 1 is a schematic flowchart of a method for power control provided by an embodiment of the present disclosure.

The execution body of the method for power control in the embodiment of the present disclosure is an apparatus for power control, and the apparatus for power control may be a terminal device or may be set in the terminal device. In this embodiment of the present disclosure, the apparatus for power control is configured in the terminal device for the purposes of illustration, but other embodiments are contemplated.

The terminal device may be any static or mobile computing device capable of data processing, such as a mobile computing device such as a notebook computer, a smart phone, a wearable device, or a stationary computing device such as a desktop computer, or a server, or other types of computing devices, etc., which are not limited in this disclosure.

As shown in FIG. 1, the method includes the following steps.

In step 101, service types of at least one service to be performed by the terminal device are determined.

The service types include voice service types, instant messaging service types, small video service types, reading service types, and less time-sensitive services. The less time-sensitive services may be for example, emails, posts, etc.

Therefore, different service types have different requirements for delay, and there are differences in the timeliness of processing. Therefore, in embodiments of the present disclosure, different priorities are set for different service types, and the priorities may be set based on requirements of different service scenarios. For example, based on the processing delay, different priorities are determined. The higher the priority, the more resources and bandwidth are required to improve the timeliness of processing.

In step 102, target transmit powers corresponding to respective services performed by the terminal device is configured according to respective service types and a power-controlled transmit power.

In an implementation of embodiments of the present disclosure, reference information sent by the current base station is obtained, and the reference signal may be SSB or (Channel State Information Reference Sign, CSI-RS), and the power-controlled transmit power corresponding to the terminal device is determined according to the reference signal and the power control protocol in the 3GPP standard. The synchronization signal and PBCH block (SSB for short) is composed of three parts together: primary synchronization signal (PSS), secondary synchronization signal (SSS), and PBCH.

Specifically, according to the reference signal obtained from the base station, the path loss $PL_{b,f,c}(q_d)$ between the UE and the base station can be calculated. The allocated bandwidth resources $10\log_{10}(2^\mu \cdot M_{b,f,c}(i))$ can be determined according to the number of resource blocks allocated for the service performed by the terminal, and the power adjustment value configured by the upper layer, the power value set between the terminal device and the base station can be obtained. The power-controlled transmit power corresponding to the terminal device can be determined by adding up.

The power-controlled transmit power can be determined by the following formula of the power control protocol:

$$P_{b,f,c}(i, q_s, l) = \min\left\{\begin{array}{c} P_{CMAX,f,c}(i), \\ P_{Cb,f,c}(q_s) + 10\log_{10}(2^\mu \cdot M_{b,f,c}(i)) + \alpha_{b,f,c}(q_s) \cdot \\ PL_{b,f,c}(q_d) + h_{b,f,c}(i, l) \end{array}\right\}$$

where, i represents a transmission opportunity, f is the carrier, c is the serving cell, b is the UL BWP identifier, l is the power control state index, μ is determined according to the msg1-SubcarrierSpacing parameter in SIB1, $P_{CMAX,f,c}(i)$ is the maximum output power of the terminal device configured for carrier f of serving cell c in each time slot, and is the parameter configured by the upper layer.

It should be noted that the power-controlled transmit power cannot be greater than the maximum transmit power of the terminal device, where the maximum output power of the terminal device is determined by the base station and sent to the terminal device. When the power-controlled transmit power is greater than the maximum transmit power, the maximum transmit power is used as the power-controlled transmit power of the terminal device.

In an implementation of embodiments of the present disclosure, there may be multiple service types performed by the terminal device, and different service types have different resource requirements, so that different services require different target transmit powers. Taking the service delay requirement as an example, voice services have higher requirements for delay, that is, try to have no delay; while mail services have lower requirements for delay, and delay is acceptable. Therefore, when power allocation is performed, the terminal device needs to allocate more target transmit power for the voice service, and allocate less target transmit power for the mail service. Therefore, according to the power-controlled transmit power calculated by the terminal device and each service type performed by the terminal device, the target transmit power corresponding to each service type is adjusted, so that different service types correspond to different target transmission powers. On the basis of ensuring the constant power controlled transmit power, the uplink power allocation for different services is dynamically adjusted, which improves the accuracy of power allocation and meets the needs of different services.

In the method for power control of embodiments of the present disclosure, by acquiring the power controlled transmit power corresponding to the terminal device, determining the service types of at least one service to be performed by the terminal device, and determining the target transmit powers corresponding to target services performed by the terminal device according to respective service types and the power controlled transmit power, dynamically allocating the uplink power for different services based on the link budget is achieved.

Figure 2:
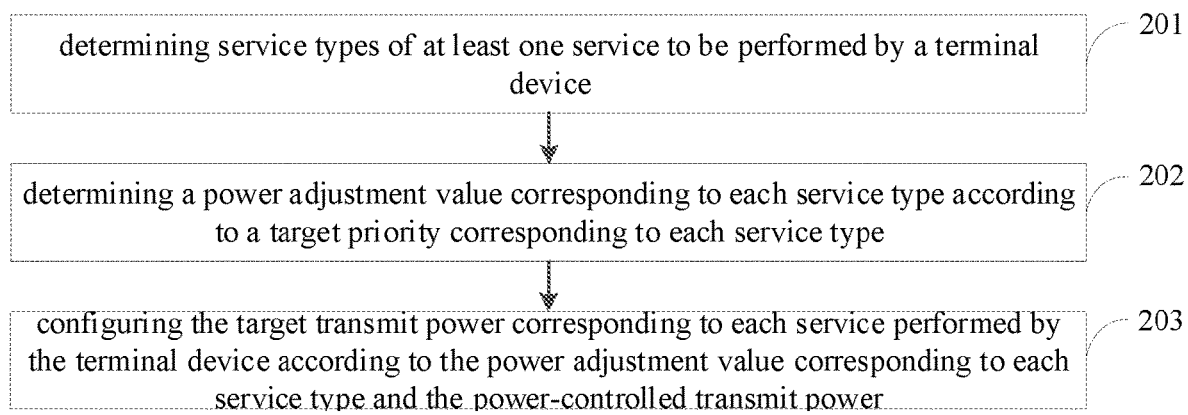
FIG. 2 is a schematic flowchart of another method for power control provided by an embodiment of the present disclosure.

Based on the above embodiment, this embodiment provides another method for power control, and FIG. 2 is a schematic flowchart of another method for power control provided by an embodiment of the present disclosure.

As shown in FIG. 2, the method may include the following steps.

In step 201, service types of at least one service to be performed by the terminal device are determined.

In an implementation of embodiments of the present disclosure, the terminal device sends at least one session establishment request to the base station according to at least one service to be performed. The session is, for example, a Protocol Data Unit (Protocol Data Unit, PDU) session, and PDU is the basic unit of sending data specified by the protocol. The PDU session carries the data type label of the established session, and the data type label indicates the service type, so that the base station can determine the service type carried by each session according to the data type label carried by each session establishment request. The terminal device obtains the service type carried by each session sent by the base station, so that the terminal device can determine each service to be performed and the service type of each service.

In step 202, a power adjustment value corresponding to each service type is determined according to a target priority corresponding to each service type.

In embodiments of the present disclosure, according to different service requirements, the target priority corresponding to each service type can be determined. For example, the priority corresponding to each service type is determined based on the time-sensitive requirements of service types in a mobile network. Table 1 shows each service type and the corresponding priority.

TABLE 1

| service type | priority (the lower the number, the higher the level) | power adjustment value |
|---|---|---|
| voice service | 1 | P1 |
| WeChat and other instant messaging | 2 | P2 |
| Douyin and other small video services | 3 | P3 |
| video service and reading service | 4 | P4 |
| Mail and other services that are not time-sensitive | 5 | P5 |

Table 1 only lists some service types, and those skilled in the art can divide the service types according to service requirements, and determine the priority corresponding to each service type, which is not limited in this embodiment.

In embodiments of the present disclosure, if the target priority corresponding to the service is high, it means that the service has a high requirement on bandwidth resources, has a small tolerance for delay, and needs to be configured with more power. That is to say, the higher the priority corresponding to the service type, the larger the corresponding power adjustment value. According to the mapping relationship between different service types and power adjustment values, the power adjustment values corresponding to different service types can be determined by looking up the table, so as to determine different power control schemes for different service types, to meet the data transmission requirements of different services.

Specifically, as shown in Table 1, P1 is the power adjustment value corresponding to the voice service. For example, the voice service is a dial-up call service. The power adjustment value P1 indicates the multiple relationship between the expected transmit power of the voice service and the determined reference transmit power. As an implementation, the multiple relationship can be converted into a corresponding dB value, that is, the power adjustment value. The effective range of the power adjustment value is [−2 dB, −1.5 dB, −1.0 dB, −0.5 dB, 0 dB, 0.5 dB, 1 dB, 1.5 dB, 2 dB]. For example, the terminal device performs two services in parallel, one is the voice service, and the other is the email service. The priority corresponding to the voice service is 1, and the corresponding power adjustment value is 2 dB, while the timeliness requirement of mail is low, and the corresponding priority is 5, and the corresponding power adjustment value is −2 dB, which realizes the determination of different power adjustment values based on different service priorities.

As another implementation, the power adjustment value may also be a coefficient. For example, the priority corresponding to the voice service is 1, and the corresponding power adjustment value is X1, while the timeliness requirement of mail is low, the corresponding priority is 5, and the power adjustment value corresponding to the mail service is X2, where X1 is greater than 1 and X2 is less than 1.

In step 203, target transmission power corresponding to each service performed by the terminal is configured according to the power adjustment value corresponding to each service type and a power-controlled transmit power.

In embodiments of the present disclosure, there may be multiple service types performed by the terminal device. Different service types have different resource requirements and corresponding processing priorities. Different service types can be set to correspond to different priorities. High-priority services may be allocated more transmit power, and low-priority services are allocated less transmit power. After adjustment, the sum of the target transmit powers allocated to respective services is still the power-controlled transmit power, which realizes dynamically allocating the target transmit powers to terminal device to perform different services, within the range of the power-controlled transmit power.

As an implementation, the power adjustment value is an offset value. For example, the terminal device synchronously performs two services, one is the voice service and the other is the mail service. The priority corresponding to the voice service is 1, and the corresponding power adjustment value is 2 dB, which the timeliness requirement of mail is low, the corresponding priority is 5, and the corresponding power adjustment value is −2 dB, which realizes dynamically allocating the target transmit powers to terminal device to perform different services, within the range of the power-controlled transmit power.

As another implementation, the power adjustment value may also be a coefficient. For example, the power adjustment value corresponding to the voice service is X1, and the power adjustment value corresponding to the mail service is X2. The target transmit power obtained for the voice service after adjustment according to the corresponding power adjustment value is P1, and the target transmit power obtained for the mail service after adjustment is P2. The sum of P1 and P2 is still equal to the power-controlled transmit power, that is to say, the increased power of the voice service is equal to the reduced power of the mail service, which realizes dynamically allocating the target transmit powers to terminal device to perform different services, within the range of the power-controlled transmit power.

For the explanation of the power-controlled adjustment value of the terminal device, reference may be made to the explanation in the foregoing embodiment, and the principle is the same, which is not repeated in this embodiment.

In the method for power control of the embodiment of the present disclosure, on the basis of the reference transmit power corresponding to each service type, the target transmit power corresponding to each service is obtained according to the power adjustment value corresponding to each service type, which achieves implementing different power control schemes for different services, to improve uplink power allocation and improve the uplink transmission performance of the terminal device.

Figure 3:
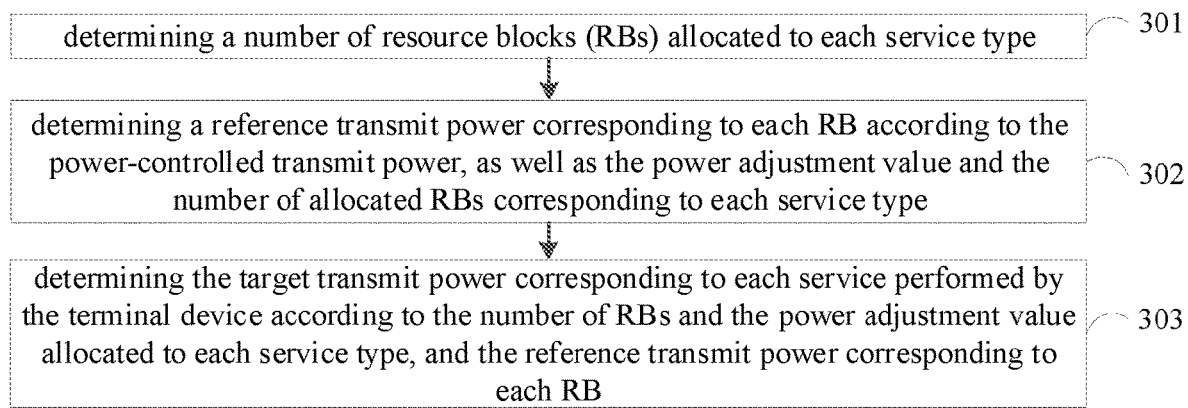
FIG. 3 is a schematic flowchart of another method for power control provided by an embodiment of the present disclosure.

In order to implement the above embodiments, FIG. 3 is a schematic flowchart of another method for power control provided by the present disclosure.

As shown in FIG. 3, step 203 includes the following steps.

In step 301, the number of resource blocks RB allocated for each service is determined.

In the embodiment of the present disclosure, the terminal device can obtain the number of resource blocks (RBs) configured by the base station, and the number of RBs configured corresponding to different service types is also different. The number of RBs allocated to different service types can be determined according to the total number of RBs allocated for the terminal device and the proportion of the number of RBs configured to different service types.

In step 302, the reference transmit power corresponding to each RB is determined according to the power-controlled transmit power, the power adjustment value corresponding to each service type, and the number of allocated RBs.

In the embodiment of the present disclosure, the power adjustment value corresponding to each service type and the number of allocated RBs have been determined, and further, according to the power-controlled transmit power, the reference transmit power corresponding to each RB can be determined.

Figure 4:
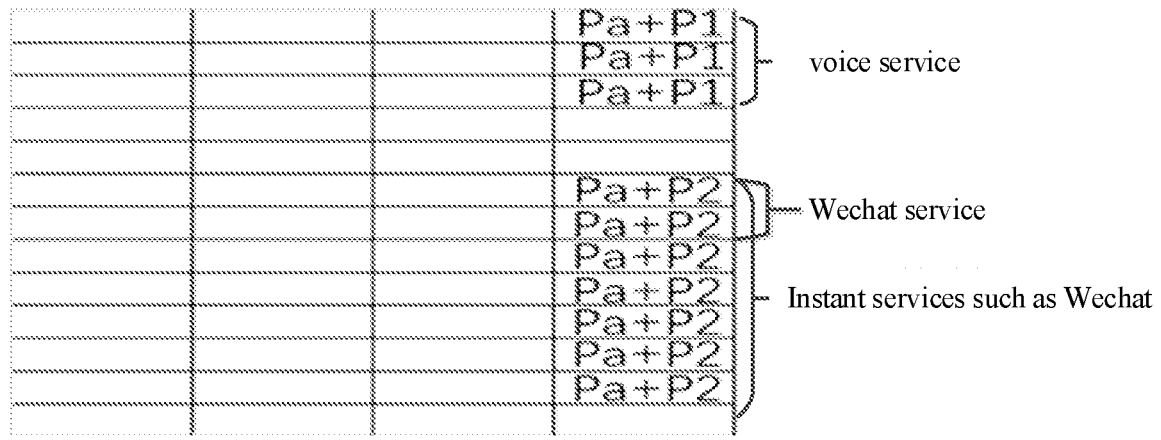
FIG. 4 is a schematic diagram of adjustment of target transmit power of each service according to an embodiment of the present disclosure.

As an example, FIG. 4 is a schematic diagram of adjusting the target transmit power of each service provided by an embodiment of the present disclosure. The number of RBs allocated for the terminal device is 10, and there are two types of services to be performed, which are voice service and instant service respectively, wherein, the number of RBs allocated for the voice service is 3, the number of RBs allocated for the instant service is 7, and the number of RBs allocated for the WeChat service is 2. As shown in FIG. 4, Pa is the reference transmit power corresponding to each RB, P1 is the power adjustment value corresponding to the voice service, P2 is the power adjustment value corresponding to the instant service, and the power controlled transmit power is P. Taking the power adjustment value as an offset as an example, then P=3(Pa+P1)+7(Pa+P2), where P1, P2 and P are all known quantities that have been determined, so that Pa, that is, the reference transmit power corresponding to each RB, can be determined.

In step 303, the target transmit power corresponding to each service performed by the terminal device is determined according to the number of RBs and power adjustment value allocated for each service type, and the reference transmit power corresponding to each RB.

For example, taking the voice service as an example, the voice service type is allocated with 3 RBs for voice data transmission. When using each RB for corresponding voice data transmission, on the basis of the reference transmit power of each RB, the power adjustment value is added, to determine the adjusted transmit power corresponding to each RB of the voice service, and according to the transmit power corresponding to each RB of the voice service, the target transmit power corresponding to the voice service is determined. Similarly, the target transmit power corresponding to each service can be determined, and the principle is the same, which is not repeated in this embodiment.

In the method for power control of the embodiment of the present disclosure, the number of resource blocks (RBs) allocated to each service type is determined, and the reference transmit power corresponding to each RB is determined according to the power-controlled transmit power, the power adjustment value corresponding to each service type, and the number of allocated RBs, and the target transmit power corresponding to each service performed by the terminal device is determined according to the number of RBs and power adjustment value allocated to each service type, as well as the reference transmit power corresponding to each RB, which achieves implementing different power control schemes for different services, to improve uplink power allocation and improve the uplink transmission performance of the terminal device.

In order to realize the above embodiments, the present disclosure also proposes an apparatus for power control.

Figure 5:
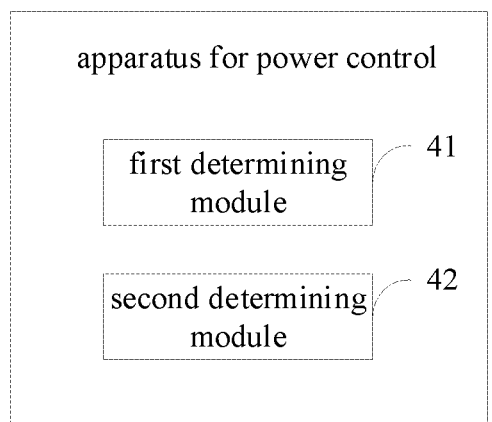
FIG. 5 is a block diagram of an apparatus for power control provided by an embodiment the present disclosure.

FIG. 5 is a block diagram of an apparatus for power control according to an embodiment of the present disclosure.

As shown in FIG. 5, the apparatus includes a first determining module 51 and a second determining module 52.

The first determining module 51 is configured to determine service types of at least one service to be performed by the terminal device.

The second determining module 52 is configured to configure the target transmit power corresponding to each service to be performed by the terminal device according to each service type and the power-controlled transmit power of the terminal device.

Further, as an implementation, the second determining module 52 is specifically configured to:
determine a power adjustment value corresponding to each service type according to a target priority corresponding to each service type; and
configure the target transmit power corresponding to each service performed by the terminal device according to the power adjustment value corresponding to each service type and the power-controlled transmit power.

As an implementation, the second determining module 52 is specifically configured to:
determine the number of resource blocks (RBs) allocated to each service;
determine a reference transmit power corresponding to each RB according to the power-controlled transmit power, the power adjustment value and the number of allocated RBs corresponding to each service type;
determine the target transmit power corresponding to each service performed by the terminal device according to the number of RBs and the power adjustment value allocated to each service, and the reference transmit power corresponding to each RB.

As an implementation, the apparatus further includes a third determining module.

The third determining module is configured to determine the power controlled transmit power corresponding to the terminal device according to a reference signal sent by a base station.

It should be noted that the foregoing explanations of the method embodiment are also applicable to the apparatus of this embodiment, and details are not repeated here.

In the apparatus for power control of the embodiment of the present disclosure, by acquiring the power controlled transmit power corresponding to the terminal device, determining the service types of at least one service to be performed by the terminal device, and determining the target transmit powers corresponding to target services performed by the terminal device according to respective service types and the power controlled transmit power, dynamically allocating the uplink power for different services based on the link budget is achieved.

In order to implement the above embodiments, the present disclosure also proposes a terminal device, including a memory, a processor, and a computer program stored in the memory and that can run on the processor. When the processor executes the program, the method described in the aforementioned embodiments is implemented.

In order to implement the above embodiments, the present disclosure further provides a non-transitory computer-readable storage medium on which a computer program is stored, and when the program is executed by a processor, the method described in the foregoing method embodiments is implemented.

In order to implement the above embodiments, the present disclosure also provides a computer program product, which stores a computer program, and when the computer program is executed by a processor, the method described in the foregoing method embodiments is implemented.

Figure 6:
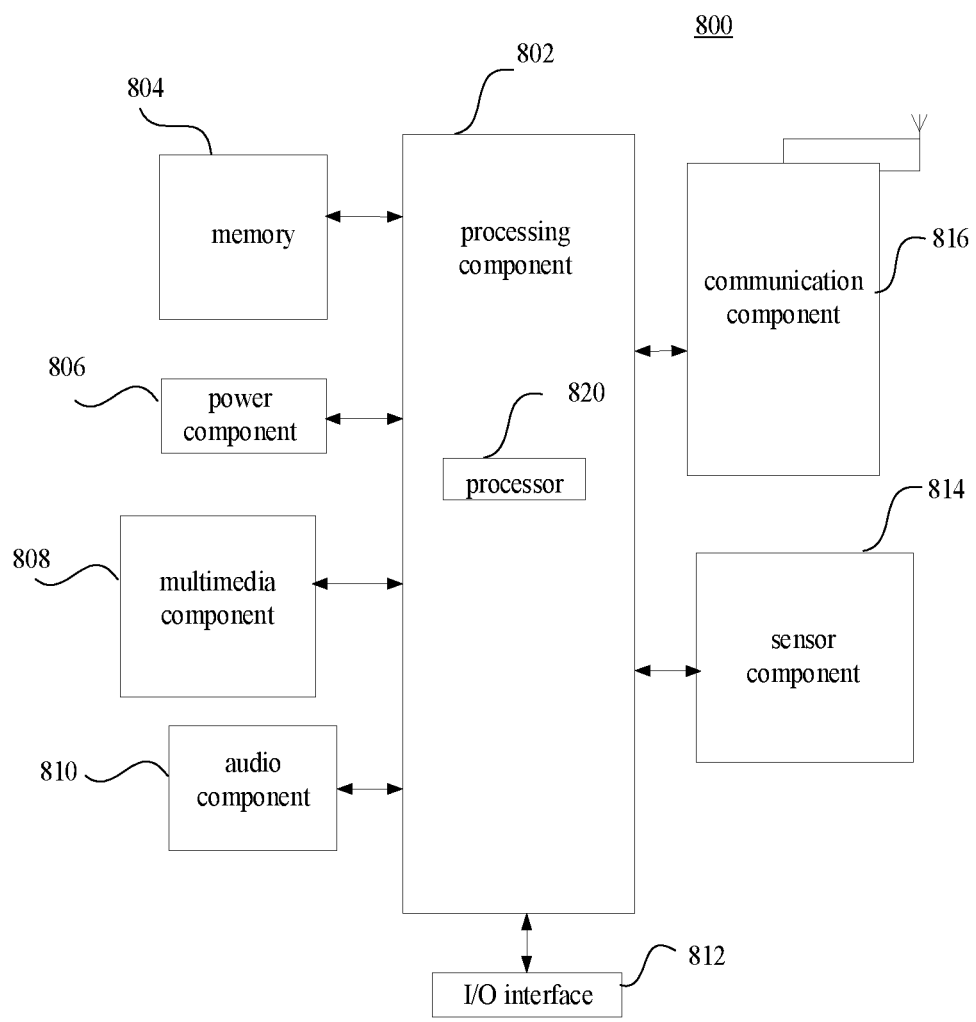
FIG. 6 is block diagram of a terminal device provided by an embodiment of the present disclosure.

FIG. 6 is a block diagram of a terminal device provided by an embodiment of the present disclosure. For example, the terminal device 800 may be a mobile phone, a computer, a digital broadcasting terminal, a messaging transceiver, a game console, a tablet device, a medical equipment, a fitness equipment, a personal digital assistant, etc.

Referring to FIG. 6, the terminal device 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the terminal device 800, such as the operations associated with display, data communications, telephone call, camera operations, and recording operations. The processing component 802 may include one or more processors 820 to execute instructions so as to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, videos, etc. The memory 804 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. The front camera and/or the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input an audio signal. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an opened/closed status of the terminal device 800, relative positioning of components (e.g., the display and the keypad) of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal device 800 and other apparatus. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, a non-transitory computer-readable storage medium including instructions, such as a memory 804 including instructions, is also provided, and the instructions are executable by the processor 820 of the terminal device 800 to complete the above method. For example, the non-transitory computer-readable storage medium may be ROM, random access memory (RAM), CD-ROM, magnetic tape, floppy disk, optical data storage device, and the like.

In the description of this specification, description with reference to the terms "one embodiment," "some embodiments," "example," "specific example," or "some examples", etc., mean specific features, structures, materials, or features described in connection with the embodiment or example are included in at least one embodiment or example of the present disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, without conflicting each other. In addition, the terms "first" and "second" are only used for descriptive purposes, and should not be construed as indicating or implying relative importance or implying the number of indicated technical features. Thus, a feature delimited with "first", "second" may expressly or implicitly include at least one of that feature. In the description of the present disclosure, "plurality" means at least two, such as two, three, etc., unless expressly and specifically defined otherwise.

Any process or method description in the flowcharts or otherwise described herein may be understood to represent a module, segment or portion of code comprising one or more executable instructions for implementing custom logical functions or steps of the process, and the scope of the preferred embodiments of the present disclosure includes alternative implementations in which the functions may be performed out of the order shown or discussed, including performing the functions substantially concurrently or in the reverse order depending upon the functions involved, which should be understood by those skilled in the art to which the embodiments of the present disclosure pertain.

The logic and/or steps represented in flowcharts or otherwise described herein, for example, may be considered an ordered listing of executable instructions for implementing the logical functions, may be embodied in any computer-readable medium, for use with, or in conjunction with, an instruction execution system, apparatus, or device (such as a computer-based system, a system including a processor, or other system that can fetch instructions from and execute instructions from the instruction execution system, apparatus, or apparatus). For the purposes of this specification, a "computer-readable medium" can be any device that can contain, store, communicate, propagate, or transport the program for use by or in connection with an instruction execution system, apparatus, or apparatus. More specific examples (non-exhaustive list) of computer readable media include the following: electrical connections with one or more wiring (electronic devices), portable computer disk cartridges (magnetic devices), random access memory (RAM), Read Only Memory (ROM), Erasable Editable Read Only Memory (EPROM or Flash Memory), Fiber Optic Devices, and Portable Compact Disc Read Only Memory (CDROM). In addition, the computer readable medium may even be paper or other suitable medium on which the program may be printed, as the paper or other medium may be optically scanned, for example, followed by editing, interpretation, or other suitable medium as necessary process to obtain the program electronically and then store it in computer memory.

It should be understood that portions of the present disclosure may be implemented in hardware, software, firmware, or a combination thereof. In the above-described embodiments, various steps or methods may be implemented in software or firmware stored in the memory and executed by a suitable instruction execution system. For example, if implemented in hardware as in another embodiment, it can be implemented by any one of the following techniques known in the art, or a combination thereof: discrete logic circuits with logic gates for implementing logic functions on data signals, ASICs with suitable combinational logic gates, Programmable Gate Arrays (PGA), Field Programmable Gate Arrays (FPGA), etc.

Those of ordinary skill in the art can understand that all or part of the steps carried by the methods of the above embodiments can be completed by instructing the relevant hardware through a program, and the program can be stored in a computer-readable storage medium. When executed, one or a combination of the steps of the method embodiment is included.

In addition, respective functional units in respective embodiments of the present disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, they may also be stored in a computer-readable storage medium.

The above-mentioned storage medium may be a read-only memory, a magnetic disk or an optical disk, and the like. Although the embodiments of the present disclosure have been shown and described above, it should be understood that the above-described embodiments are exemplary and should not be construed as limitations of the present disclosure, and those of ordinary skill in the art may perform change, modifications, substitutions and variations to the above-described embodiments.

What is claimed is:

1. A method for power control, comprising:
    determining service types of at least one service to be performed by a terminal device;
    configuring a target transmit power corresponding to each service performed by the terminal device according to each service type and a power-controlled transmit power of the terminal device, comprising:
        determining a power adjustment value corresponding to each service type according to a target priority corresponding to each service type;
        configuring the target transmit power corresponding to each service performed by the terminal device according to the power adjustment value corresponding to each service type and the power-controlled transmit power,
    wherein configuring the target transmit power corresponding to each service performed by the terminal device according to the power adjustment value corresponding to each service type and the power-controlled transmit power comprises:
        determining a number of resource blocks (RBs) allocated to each service type;
        determining a reference transmit power corresponding to each RB according to the power-controlled transmit power, as well as the power adjustment value and the number of allocated RBs corresponding to each service type; and
        determining the target transmit power corresponding to each service performed by the terminal device according to the number of RBs and the power adjustment value allocated to each service type, and the reference transmit power corresponding to each RB.

2. The method according to claim 1, further comprising:
    determining the power controlled transmit power corresponding to the terminal device according to a reference signal sent by a base station.

3. The method according to claim 1, wherein determining the service types of at least one service to be performed by the terminal device comprises:
    sending at least one session establishment request to a base station;
    receiving a service type carried by each session sent by the base station, wherein the service type carried by the session is determined by the base station according to a data type label carried by each of the session establishment requests.

4. The method according to claim 1, wherein a sum of target transmit powers corresponding to services performed by the terminal device is equal to the power-controlled transmit power of the terminal device.

5. The method according to claim 1, wherein the higher the target priority of the service type, the greater the power adjustment value corresponding to the service type.

6. A terminal device, comprising:
at least one processor; and
a memory communicatively coupled to the at least one processor; wherein,
the memory is stored with instructions executable by the at least one processor, and when the instructions are executed by the at least one processor, the at least one processor is configured to:
determine service types of at least one service to be performed by the terminal device;
configure a target transmit power corresponding to each service performed by the terminal device according to each service type and a power-controlled transmit power of the terminal device;
wherein, the at least one processor is configured to:
determine a power adjustment value corresponding to each service type according to a target priority corresponding to each service type;
configure the target transmit power corresponding to each service performed by the terminal device according to the power adjustment value corresponding to each service type and the power-controlled transmit power,
wherein the at least one processor is configured to:
determine a number of resource blocks (RBs) allocated to each service type;
determine a reference transmit power corresponding to each RB according to the power-controlled transmit power, as well as the power adjustment value and the number of allocated RBs corresponding to each service type; and
determine the target transmit power corresponding to each service performed by the terminal device according to the number of RBs and the power adjustment value allocated to each service type, and the reference transmit power corresponding to each RB.

7. The terminal device according to claim 6, wherein the at least one processor is further configured to:
determine the power controlled transmit power corresponding to the terminal device according to a reference signal sent by a base station.

8. The terminal device according to claim 6, wherein the at least one processor is configured to:
send at least one session establishment request to a base station;
receive a service type carried by each session sent by the base station, wherein the service type carried by the session is determined by the base station according to a data type label carried by each of the session establishment requests.

9. The terminal device according to claim 6, wherein a sum of target transmit powers corresponding to services performed by the terminal device is equal to the power-controlled transmit power of the terminal device.

10. The terminal device according to claim 6, wherein the higher the target priority of the service type, the greater the power adjustment value corresponding to the service type.

11. A non-transitory computer readable storage medium stored with computer instructions for enabling a computer to perform a method for power control, the method comprising:
determining service types of at least one service to be performed by a terminal device;
configuring a target transmit power corresponding to each service performed by the terminal device according to each service type and a power-controlled transmit power of the terminal device,
wherein, configuring the target transmit power corresponding to each service performed by the terminal device according to each service type and the power-controlled transmit power of the terminal device comprises:
determining a power adjustment value corresponding to each service type according to a target priority corresponding to each service type;
configuring the target transmit power corresponding to each service performed by the terminal device according to the power adjustment value corresponding to each service type and the power-controlled transmit power,
wherein, configuring the target transmit power corresponding to each service performed by the terminal device according to the power adjustment value corresponding to each service type and the power-controlled transmit power comprises:
determining a number of resource blocks (RBs) allocated to each service type;
determining a reference transmit power corresponding to each RB according to the power-controlled transmit power, as well as the power adjustment value and the number of allocated RBs corresponding to each service type; and
determining the target transmit power corresponding to each service performed by the terminal device according to the number of RBs and the power adjustment value allocated to each service type, and the reference transmit power corresponding to each RB.

12. The storage medium according to claim 11, wherein the method further comprises:
determining the power controlled transmit power corresponding to the terminal device according to a reference signal sent by a base station.

13. The storage medium according to claim 11, wherein determining the service types of at least one service to be performed by the terminal device comprises:
sending at least one session establishment request to a base station;
receiving a service type carried by each session sent by the base station, wherein the service type carried by the session is determined by the base station according to a data type label carried by each of the session establishment requests.

14. The storage medium according to claim 11, wherein a sum of target transmit powers corresponding to services performed by the terminal device is equal to the power-controlled transmit power of the terminal device.

15. The storage medium according to claim 11, wherein the higher the target priority of the service type, the greater the power adjustment value corresponding to the service type.

* * * * *